United States Patent [19]
Yamada et al.

[11] Patent Number: 5,482,790
[45] Date of Patent: Jan. 9, 1996

[54] FUEL CELL POWER GENERATION SYSTEM

[75] Inventors: Shuji Yamada; Motoya Kanda, both of Yokoyama; Hiroyasu Yoshizawa, Omiya; Atsuo Sonai, Yokohama, all of Japan

[73] Assignee: Kabushiki Kaisha Toshiba, Kanagawa, Japan

[21] Appl. No.: 431,970

[22] Filed: May 1, 1995

Related U.S. Application Data

[63] Continuation of Ser. No. 106,978, Aug. 16, 1993, Pat. No. 5,434,015.

[30] Foreign Application Priority Data

Sep. 8, 1992 [JP] Japan ................................. 4-239588
Apr. 2, 1993 [JP] Japan ................................. 5-76761

[51] Int. Cl.$^6$ ........................................ H01M 16/00
[52] U.S. Cl. ........................... 429/9; 429/19; 429/26; 429/62
[58] Field of Search .................... 429/9, 26, 19, 429/22, 24, 62

[56] References Cited

U.S. PATENT DOCUMENTS

| | | |
|---|---|---|
| 3,539,397 | 11/1970 | Keating, Jr. et al. . |
| 3,718,506 | 2/1973 | Fischer et al. . |
| 4,621,033 | 11/1986 | Tsutsumi et al. ........................ 429/12 |
| 4,677,037 | 6/1987 | Takabayashi ............................ 429/9 |
| 4,849,308 | 7/1989 | Schmitten et al. ...................... 429/37 |
| 4,973,531 | 11/1990 | Zaima et al. ............................ 429/37 |
| 5,176,969 | 1/1993 | Miyabayashi et al. ................. 429/212 |
| 5,244,757 | 9/1993 | Takami et al. .......................... 429/194 |
| 5,334,463 | 8/1994 | Tajima et al. ............................ 429/9 |

FOREIGN PATENT DOCUMENTS

| | | |
|---|---|---|
| 2949011C2 | 6/1981 | Germany . |
| 3345956A1 | 6/1984 | Germany . |
| 3345958A1 | 6/1984 | Germany . |
| 3528673C2 | 2/1986 | Germany . |
| 4001684A1 | 7/1991 | Germany . |
| 51-24768 | 7/1976 | Japan . |
| WO93/09572 | 5/1993 | WIPO . |

*Primary Examiner*—Stephen Kalafut
*Attorney, Agent, or Firm*—Finnegan, Henderson, Farabow, Garrett & Dunner

[57] ABSTRACT

To generate electric energy to a load such as an electric car or the like, a fuel cell power generation system includes a fuel cell composed of a fuel electrode and an oxygen electrode with an electrolytic layer interposed therebetween so as to continuously supply electric power to the load, a secondary cell for supplying a required quantity of electric energy to the load at least during the initial time until the generation of electric energy is started with the fuel cell and a shifting unit serving to shift the power source of electric energy to the load from the fuel cell main body to the secondary cell or from the secondary cell to the fuel cell. An electrolytic layer constituting the fuel cell is composed of a film of high molecular material having ionic conductivity, and the secondary cell is a secondary lithium cell consisting of a nonaqueous solution based material or a solid electrolyte based material as an electrolyte.

16 Claims, 10 Drawing Sheets

FUEL CELL POWER GENERATION SYSTEM

This is a continuation of application Ser. No. 08/106,978, filed Aug. 16, 1993, now U.S. Pat. No. 5,434,015.

BACKGROUND OF THE INVENTION

The present invention relates to a power generation system using a fuel cell. More particularly, the present invention relates to a power generation system suitable for use as a power source (driving power supply source) for a load such as an electric car or the like.

In recent years, it is expected that electric cars producing no exhaust gas and generating almost no noise are increasingly substituted for conventional automobiles which have an internal combustion engine requiring gasoline as a fuel mounted thereon year by year. In contrast with the conventional automobile including an internal combustion engine, since each electric car is driven by rotating an electric motor with the aid of a battery serving as a power source to rotate wheels, a most important subject to be solved for putting electric cars in practical use on the commercial basis is concerned with the substantial improvement of properties of each battery serving as a power source for each electric car. In practice, many requests have been raised from users for providing a light battery for an electric car which assures that a large quantity of electrical energy can be stored in the battery so as to enable the electric car to run a sufficiently long distance. However, in case of a hitherto commercially available battery, e.g., a secondary battery such as a lead battery or the like, it has been pointed out as problems that the electric car can run merely by a short distance per each charging compared with a weight of the battery, and moreover, a long time is taken until each charging operation is completed.

In the circumstances as mentioned above, much attention has been lately paid to a fuel cell of the type which can be used in place of the conventional lead battery to serve as a power source for an electric car to enable it to run for a long distance while generating electricity by decomposing a fluid fuel, e.g., a methanol into hydrogen gas in a reforming unit, reforming the thus produced hydrogen gas in the reforming unit, and then allowing the hydrogen gas to react with oxygen in the fuel cell. In other words, in case of the foregoing type of fuel cell, since a raw material used as fuel can be stored in a vehicle in liquid form having a small volume, and moreover, this liquid can be fed to the vehicle in the form of a large quantity of fuel gas (hydrogen gas), a large enough quantity of energy to allow the electric car to run a sufficiently long distance can be stored and reserved in the fuel cell.

To facilitate understanding of the present invention, a typical conventional power generation system using a fuel cell of the foregoing type will be described below with reference to FIG. 1.

FIG. 1 is a systematic diagram which schematically shows essential components of a fuel cell and a secondary cell constituting the power generation system for an electric car. In the drawing, reference numeral 1 designates a fuel cell main body, and reference numeral 2 designates a reforming unit. The fuel cell main body 1 is constructed such that a unit cell is composed of an electrolytic plate $1a$, a fuel electrode $1b$ disposed along one surface of the electrolytic plate $1a$ and an oxygen electrode $1c$ disposed along other surface of the electrolytic plate $1a$ and that a plurality of unit cells each composed in that way are laminated one above another to form a laminated structure. The fuel cell main body 1 includes a cooling member $1d$, and when the generation of electric energy is started with the power generation system, a coolant (air) is taken from a coolant inlet port 4 and it is then fed to the cooling member $1d$ via a coolant preheater 5 so as to cool the fuel main body 1.

On the other hand, a liquid fuel (methanol) is fed to an evaporator 6 from a fuel tank (e.g. a methanol tank) $3a$ and water is fed from a water tank $3b$ to the evaporator 6. The liquid fuel and the water are evaporated in the evaporator 6. Subsequently, the evaporated vapor is heated and decomposed by operating a burner $2a$ in the reforming unit 2, thereby hydrogen gas usable as fuel gas being produced. Subsequently, the hydrogen gas produced in the reforming unit 2 is fed to the fuel electrode $1b$ in the fuel cell main body 1 and reacts with air (oxygen) taken therein via an air inlet 7 on the oxygen electrode $1c$, whereby desired power generation is achieved in the fuel cell main body 1. Since the air after contribution to the power generation contains a large quantity of water vapor, the water is recovered in a water recovering unit 8, and the recovered water is returned to the water tank $3b$, and the air is exhausted to the outside via an air exhaust outlet 9. Since power generation in the fuel cell main body 1 in the form of exothermic reaction, it is necessary that a coolant (air) is taken in the power generation system via a coolant inlet 4 and is fed to the cooling member $1d$ via a coolant preheater 5 so as to cool the fuel cell main body 1 with the coolant. After completion of the cooling operation of the cooling member $1d$, the coolant is exhaust to the outside via a coolant exhaust outlet 10.

Thus, the power generation is carried out.

However, the fuel cell for the conventional power generation system has problems as noted below.

One of them is such that since an operating temperature for inducing a power generating function lies at a high level ranging from about 200° to 650° C. which varies depending on the kind of an electrolyte constituting the fuel cell main body 1, it is necessary that the fuel cell main body 1 is heated for activating the fuel cell main body 1, resulting in a long time being taken until the generation of electric energy is started with the fuel cell main body 1. The other problem is such that the power generation system exhibits poor responsibility when a magnitude of the load varies in the course of normal operation of the power generation system as is often the case with an automobile running in the accelerated state or in the decelerated state.

To cope with the foregoing problems, a hybrid type power generation system has been proposed wherein a fuel cell bears a task for allowing an electric car to run by a sufficiently long distance, and a secondary cell bears a task for maintaining electric energy at the starting time or at the time when a magnitude of load varies (see an official gazette of Japanese Patent Publication NO. SHO51-24768 (1976).

Further, it is disclosed that a fuel cell main body is heated up to an elevated temperature by utilizing the energy given by a secondary cell until it reaches a predetermined temperature which makes it possible to generate electric power with the fuel cell main body 1. Specifically, the secondary cell serves as a power source for a coolant preheater at the starting time or the like, and moreover, the coolant serves as a heating medium for heating the fuel cell main body 1. Incidentally, with the hybrid type power generation system including a combination of the fuel cell main body 1 with the secondary cell, when charging of the secondary cell is achieved with the fuel cell main body 1, a charging time can substantially be shortened.

However, in case of the hybrid type-power generation system constructed in the above-described manner, the following problems are recognized from the viewpoint of practical use. Specifically, in case that a phosphoric acid is employed as an electrolyte, the power generation system operates at a temperature of about 200° C., and in case that a molten salt is employed as an electrolyte, the power generation system operates at a temperature of about 650° C. In other words, to assure that the power generation system makes it possible to generate electric energy, it is necessary that the fuel cell main body is heated up to a considerably high temperature. For this reason, even though, e.g., a secondary cell additionally disposed for the power generation system is utilized as a heat source, a comparatively long time (e.g., one hour) is taken for heating the fuel cell main body up to an elevated temperature. Therefore, one of the problems is such that the secondary cell is vigorously consumed, and the other one is such that high temperature heat is radiated toward the fuel cell main body 1 and associated components.

On the other hand, in case that the foregoing type of power generation system is employed for an electric car, it is unavoidable that the fuel cell main body 1 and the secondary cell such as a lead battery or the like each supplying electric energy to a predetermined load (e.g., a driving motor, an air conditioner, a lighting device or the like) are closely disposed adjacent to each other due to severe restriction on the space required for disposing or mounting on the electric car. As heat is radiated from the fuel cell main body 1, malfunctions arise with the secondary cell such as a lead battery, a nickel zinc battery, a nickel cadmium battery or the like disposed within the heat radiation range in such a manner that materials constituting the secondary cell are thermally deteriorated due to the heating induced by the heat radiation, the life of charging/discharging cycle is shortened or liquid leakage occurs, resulting in performances of the secondary cell being readily degraded.

In addition, since the power generation system mounted on the electric car receives vibrations and shocks during running of the electric car due to acceleration or deceleration caused when the electric car starts or stops its running, the laminated cell structure constituting the fuel cell main body is readily dislocated from the original position. Further, since the power fed from the fuel cell main body to a load such as a driving motor or the like via a converter usually has an intensity of about 100 amperes or more, the fuel cell main body and the converter are electrically connected to each other via a bus bar 11 made of a plate-shaped metallic material such as nickel or the like having excellent electrical conductivity and a large thickness while extending therebetween as shown in FIG. 2 that is a perspective view of the bus bar 11. Although the bus bar 11 is connected to the fuel cell main body and the converter by tightening bolts and nuts, the connected portions on the bus bar 11 are increasingly loosened during running of the electric car due to vibrations, acceleration or deceleration caused when the electric car starts or stops its running, resulting in the electrical contact resistance arising at the connected portions being undesirably increased. As a high intensity of electric current flows via the bus bar 11, the bus bar 11 is heated and oxidized, causing the electrical resistance to be increased more and more. This leads to the result that the performances of the fuel cell main body 1 are largely and quickly degraded. At any rate, each of the trials hitherto conducted for employing the foregoing type of power generation system as a power source for the electric car by adequately combining advantageous effects of the fuel cell with those of the secondary cell has not been evaluated as effective means at present.

SUMMARY OF THE INVENTION

The present invention has been made in consideration of the aforementioned background.

A first object of the present invention is to provide a power generation system using a fuel cell wherein the initial time until the generation of electric energy is started with the fuel cell can substantially be shortened while maintaining high reliability of the power generation system, and moreover, preventing the performances of a secondary cell additionally disposed in the power generation system from being degraded.

A second object of the present invention is to provide a power generation system using a fuel cell wherein the power generation system operates while maintaining high reliability without any occurrence of malfunctions that a laminated cell structure constituting the fuel cell is dislocated from the original position due to vibrations of an electric car caused at the starting time or the like, and moreover, connected portions on bus bars for connecting a fuel cell and a converter to each other are undesirably loosened during running the electric car.

According to a first aspect of the present invention, there is provided a power generation system using a fuel cell wherein the power generation system comprises a reforming unit for heating and decomposing a raw material composed of a liquid fuel and water as essential components using combustion gas to produce hydrogen gas, a fuel cell for continuously supplying electric energy to a predetermined load, the fuel cell including an electrolytic layer, a fuel electrode disposed along one main surface of the electrolytic layer, and an oxygen electrode disposed along other main surface of the electrolytic layer, the electrolytic layer being interposed between the fuel electrode and the oxygen electrode, a secondary cell for supplying a required quantity of electric energy to the load at least during the initial time until the generation of electric energy is started with the fuel cell main body or at the time when a magnitude of the load varies, and means for shifting the power source of electric energy from the fuel cell to the secondary cells or from the secondary cells to the fuel cell, wherein the electrolytic layer constituting the fuel cell is composed of a film of high molecular material having ionic conductivity, and each of the secondary cell is a secondary lithium cell comprising a nonaqueous solution based material or a solid electrolyte based material.

According to a second aspect of the present invention, there is provided a power generation system using a fuel cell wherein the power generation system comprises, a fuel cell including a fuel electrode and an oxygen electrode with an electrolytic layer interposed between the fuel electrode and the oxygen electrode so as to continuously supply electric energy to a predetermined load, a reforming unit for heating and decomposing a raw material composed of a liquid fuel and water as main components using combustion gas to produce hydrogen gas for feeding to the fuel electrode, a secondary cell for supplying a required quantity of electric energy to the load at least during the initial time until the generation of electric energy is started with the fuel cell or at the time when a magnitude of the load varies, and means for shifting the power source of electric energy from the fuel cell to the secondary cell or from the secondary cell to the fuel cell, wherein the power generation system includes fuel cell heating means for heating the fuel cell up to a predetermined temperature so as to enable the fuel cell to start the generation of electric energy by supplying to the fuel cell side the combustion gas used for heating and decomposing the raw material in the reforming unit.

According to a third aspect of the present invention, there is provided a power generation system using fuel cells wherein the power generation system comprises a fuel cell main body including a fuel electrode and an oxygen electrode with an electrolytic layer interposed between the fuel electrode and the oxygen electrode, power supplying means for continuously supplying an electric energy generated by the fuel cell main body to a predetermined load, the means comprising a convertor and electrical conductive bus bars for electrically connecting the fuel cell main body to the convertor, a common base on which at least the converter and the fuel cell main body electrically connected to each other via the bus bars are mounted, and a vibration absorbing member interposed between the common base and a mounting base for mounting the common base thereon.

In addition, in the third aspect of the present invention, the fuel cell main body is firmly mounted on the common base with the aid of fixing means through an electrical insulating layer the fuel cell main body.

In the power generation system constructed according to the first aspect of the present invention, a perfluorocarbon sulfonic acid polymer and a polystyrene based cation exchange film having sulfonic acid group can be noted as materials employable for a film of high molecular material having ionic conductivity to form the electrolytic layer for the fuel cell.

As materials for an anode of the secondary lithium cell, a metallic lithium, a lithium alloy (LiAl, LiPb, LiSn, LiBi or the like), a high molecular material having electrical conductivity such as polyacetal, polyacetylene, polypyrrole or the like each having lithium ions absorbed therein, and a pyrolyzed organic material (carbon based material) can be noted. Among the aforementioned materials, it is preferable from the viewpoint of safety that an anode composed of the carbon material is employed for forming the anode of the secondary lithium cell. A coke, a carbon fiber, a spherical carbon, a pyrolyzed resin material, a graphite, a vapor phase pyrolyzed carbon or the like each obtainable by pyrolyzing a material selected from a group consisting of a petroleum pitch, a coal tar, a heavy oil, a synthetic pitch, a high molecular synthetic material, an organic resin or the like as a raw material can be noted as materials employable for the carbon material.

According to the present invention, it is preferable that the carbon material having a comparatively highly grown graphite structure is employed as a material for the anode of the secondary lithium cell. When the carbon material having a well-grown graphite structure is employed as a material for the anode of the secondary lithium cell, the secondary lithium cell can maintain a high capacity without self-discharging within the working temperature range of 40° to 100° C. of the power generation system of the present invention.

Carbon materials having the well-grown graphite structure have the following physical properties.

(1) An average distance $d_{(002)}$ between adjacent (002) plane of crystallite of a carbon material is 0.37 nm or less, more preferably, 0.33 nm or more to 0.34 nm or less as measured by a X-ray diffraction analysis process. When the carbon material having an average distance $d_{(002)}$ lying within the foregoing range is employed for the anode of the secondary lithium cell, the capacity of the secondary lithium cell can be enlarged. In addition, the life of a charging/discharging cycle of the secondary lithium cell can be elongated. It is considered that this is attributable to the fact that when the average distance $d_{(002)}$ lies within the foregoing range, many lithium ions are readily occluded between adjacent hexagonal net-shaped planes in the carbon material, so that the ions are readily absorbed and discharged.

(2) Carbon material having a graphite structure of which crystallite has an average length La in the a-axis direction of 10 nm or more as measured from the diffraction peak of (100) plane or (10) plane by the X-ray diffraction analysis.

(3) Carbon material having a graphite structure of which crystallite has an average length Lc in c-axis direction of 15 nm or more as measured from the diffraction peak of (002) plane or (004) plane by the X-ray diffraction analysis.

When the carbon material having the average lengths La and Lc lying within the foregoing ranges is employed for each secondary lithium cell, the capacity of the secondary lithium cell can be enlarged. It is considered that this is attributable to the fact that the carbon material having the average lengths La and Lb lying within the foregoing ranges exhibits a well-grown graphite structure, causing a quantity of occlusion of lithium ions to be enlarged.

In the present invention, measurement data derived from the X-ray diffraction analysis were obtained under conditions that CuKα was taken as a X-ray source, a silicon having a high purity was taken as a reference material, and La, $d_{(002)}$ and Lc were determined based on the position of peak of each X-ray diffraction and the half value width of the same. To calculate the foregoing measurement data, a Scherrer's formula $[L=(k\lambda/\beta \cos \theta)]$ was employed so as to allow La, and Lc to be determined by employing a half value width midpoint point method. Here, L designates a size of each crystallite corresponding to a diffraction angle θ, λ designates a wavelength of X-ray, and β designates an intensity correction factor. In addition, La and Lc represent values obtained when k, i.e., a shape factor in the Scherrer's formula was 0.89.

(4) Carbon material of which ratio $R_1/R_2$ of a peak intensity ($R_1$) at 1360 cm$^{-1}$ of a Raman spectrum measured with the carbon material using an argon laser light beam (having a wavelength of 514.5 nm) as a light source to a peak intensity ($R_2$) at 1580 cm$^{-1}$ of the same assumes a value of 1 or less.

The carbon material exhibits such a structure that crystalline portions each exhibiting a graphite structure and amorphous portions each exhibiting a disordered layer structure are intermixed in the structure. To determine a ratio of the graphite structure to the disordered layer structure, a Raman spectrum was measured with the carbon material using an argon laser light beam (having a wavelength of 514.5 nm) as a light source. The results derived from measurements of the Raman spectrum reveal that a peak attributable to the presence of the disorder layer structure appeared in the vicinity of 1360 cm$^{-1}$, and moreover, another peak attributable to the presence of the graphite structure appeared in the vicinity of 1580 cm$^{-1}$. According to the present invention, it is preferable that a carbon material of which ratio $R_1/R_2$ of the peak intensity ($R_1$) at 1360 cm$^{-1}$ to the peak intensity of ($R_2$) at 1580 cm$^{-1}$ of the Raman spectrum measured with the carbon material using an argon laser light beam (having a wavelength of 514.5 nm) as a light source in the above-described manner assumes a value of 1 or less is used as a material employable for the anode of secondary lithium cell.

As materials employable for the cathode of the secondary lithium cell, a manganese dioxide, a lithium based composite metal oxide such as lithium manganese composite oxide, lithium nickel composite oxide, lithium cobalt composite oxide, lithium vanadium composite oxide or the like and a chalcogen compound such as titanium dioxide, molibudenum disulfide or the like can be noted among the aforementioned compounds, the lithium based composite metal oxide is most preferably employable as a material for the cathode of the secondary lithium cell because a high voltage can be obtained with it.

On the other hand, a nonaqueous solution based electrolyte is usually used as an electrolytic solution for secondary lithium cell in such a manner that an electrolyte, e.g., lithium perchlorate, lithium hexafluorophosphate, lithium borofluorate, lithium hexafluoroarsenate, lithium trifluorometasulfonate, lithium bistrifluoromethyl-sulfonil-imide or the like is dissolved in a solvent, e.g., propylene carbonate, ethylene carbonate, dimethyl carbonate, diethyl carbonate, tetrahydrofuran, 2-methyl-tetrahydrofuran, γ butyl-lactone, 1,2-dimethoxy ethane, diethoxy ethane, 1,3-dioxolane, 1,3-dimethoxy propane or the like. Especially, since a compound obtained when lithium bistrifluoromethyl-sulfonil-imide is used as a lithium salt is kept stable within the temperature range of 40° to 100° C., the foregoing compound is preferably employable for the power generation system of the present invention. The resultant electrolytic solution can be used in such a manner that it is impregnated in a separator made of a polyolefin film having a large number of fine holes each having a diameter in submicron order formed thereon so as to enable lithium ions to pass therethrough.

As a solid electrolyte for secondary lithium cell, a polypropylene-oxide based solid electrolyte containing polyethylene-oxide units in molecule, polypropiol-acetate based solid electrolyte, a polymethacrylic acid ester based solid electrolyte containing ethylene-oxide in a side chain, a compound composed of one of derivatives of the aforementioned materials and a lithium salt can be noted.

In case of the power generation system constructed according to the first aspect of the present invention, the electrolytic layer of the fuel cell is composed of a film of high molecular material having ionic conductivity so as to operate at a lower temperature (e.g., 40° to 100° C.), and a secondary lithium cell having a nonaqueous electrolytic solution or a solid electrolyte employed as an electrolyte is used as a secondary cell, whereby the secondary lithium cell can maintain excellent charging/discharging properties within the working temperature range of the fuel cell main body. In other words, with the power generation system constructed in that way, the fuel cell contributing to continuous electricity generation generates a required electric energy at a comparatively low temperature ranging from, e.g., 40° to 100° C. On the other hand, since the fuel cell main body generates electric energy at a comparatively low temperature, the secondary lithium cell contributing to auxiliary power generation has few possibility that the temperature of the secondary lithium cell is raised up but it exhibits excellent charging/discharging properties within the working temperature range of the fuel cell main body. Thus, the fuel cell main body bears a task for exhibiting a function required as a power source for an electric car, i.e., a function of allowing the electric car to run by a sufficiently long distance, while the secondary cells bear a task for maintaining electric energy during the initial time until the generation of electric energy is started with the fuel cell main body or at the time when a magnitude of load varies.

In case of the power generation system constructed according to the second aspect of the present invention, the combustion gas produced in the reforming unit at a high temperature is caused to flow to the fuel cell main body side so as to heat the fuel cell main body with the combustion gas, whereby the initial time until the power generation is started with the fuel cell main body can easily and reliably be shortened.

In addition, in case of the power generation system constructed according to the third and fourth aspects of the present invention, since at least the fuel cell main body and the converter electrically connected to each other via the bus bars made of a metallic plate having a large thickness and excellent electrical conductivity while extending therebetween are mounted on the common base, relative dislocation of the fuel cell main body and the converter relative to each other can be suppressed in the coplanar relationship. Consequently, there does not arise a malfunction that connected portions not only between the bus bars and the fuel cell main body but also between the bus bars and the converter are undesirably loosened. Hence, an increase of the contact resistance appearing at each connected portion and oxidation of the respective components due to heat generation can be prevented.

DESCRIPTION OF THE PREFERRED EMBODIMENTS

The present invention will now be described in detail hereinafter with reference to FIG. 3 to FIG. 19 which illustrate several preferred embodiments thereof.

Embodiment 1

Figure 1:
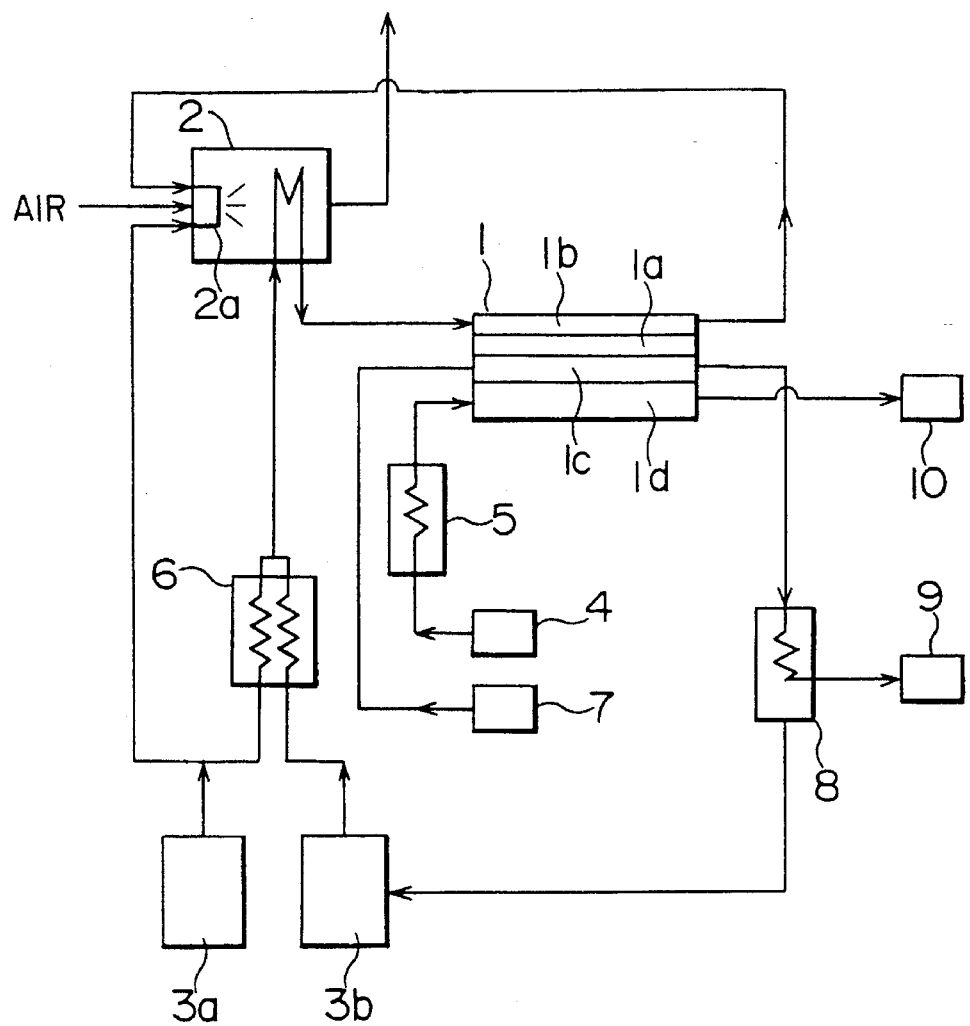
FIG. 1 is a systematic diagram which schematically shows the structure of a conventional power generation system for an electrical car using a fuel cell.
Figure 2:
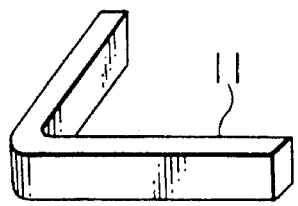
FIG. 2 is a perspective view which shows by way of example a bus bar employable for the conventional power generation system.
Figure 3:
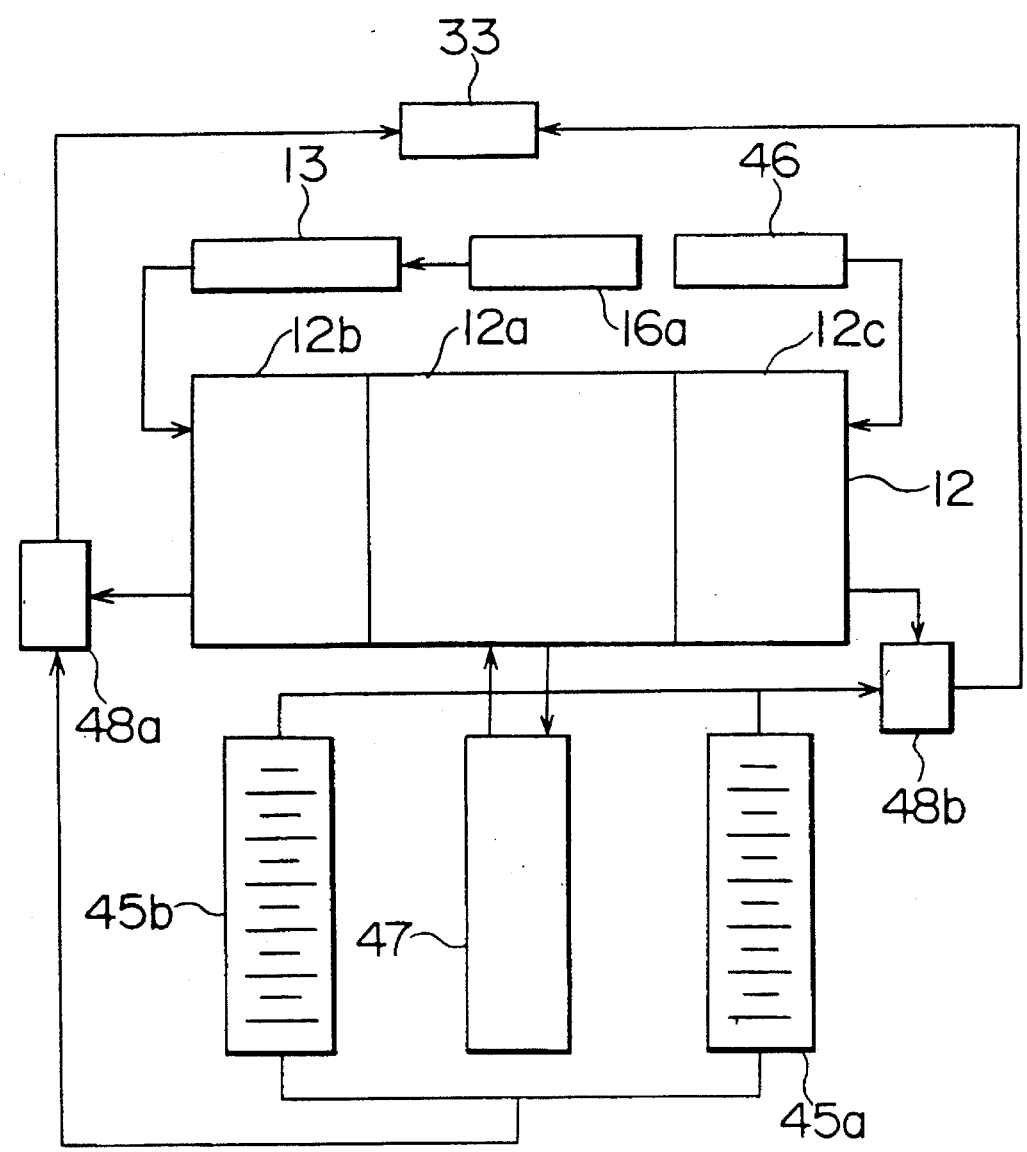
FIG. 3 is a systematic diagram which schematically shows the structure of a power generation system using a fuel cell according to a first embodiment of the present invention.

FIG. 3 is a systematic diagram which schematically shows the structure of a fuel cell power generation system for an electric car according to a first embodiment of the present invention.

As shown in FIG. 3, the power generation system includes a fuel cell main body 12 for generating electric energy by taking hydrogen and oxygen therein, a reforming unit 13 in which hydrogen gas is produced in the presence of a catalyzer in an atmosphere having a high temperature and then fed to the fuel cell main body 12, and secondary lithium cells 45a and 45b. The fuel cell main body 12 includes a fuel electrode 12b, an electrolytic plate 12a, and an oxygen electrode 12c, and an electrolyte in the electrolytic plate 12a is composed of a film of high molecular material (e.g., a film of perfluorocarbon sulfonic acid) which exhibits a function of ionic conductivity at a temperature ranging from about 60° to 100° C. Hydrogen gas is produced by taking in the reforming unit 13 a liquid fuel (methanol) fed from a fuel tank 16a and water fed from a water tank (not shown) and then heating them Subsequently, the thus produced hydrogen gas is fed to the fuel electrode 12b. On the other hand, air (oxygen) compressed by a compressor 46 is fed to the oxygen electrode 12c in the fuel cell main body 12.

The secondary lithium cells 45a and 45b are disposed in the vicinity of the opposite sides of a refrigerant tank 47 in which a refrigerant is received for cooling the fuel cell main body 12. A nonaqueous electrolytic solution containing $LiPF_6$ in a solvent mixture consisting of ethylene carbonate and propylene carbonate is used as an electrolyte in each of the secondary lithium cells 45a and 45b. Incidentally, each of the ethylene carbonate and the propylene carbonate is a nonaqueous solvent having a boiling temperature of 100° C. or more. A carbon material having a function of occluding and discharging lithium ions is used as a material for an anode of each of the secondary lithium cells 45a and 45b, while $LiCoO_2$ is used as a material for a cathode. In practical case, to use mesophase pitch based fiber as a raw material employable for the foregoing carbon material, the carbon material was produced by way of the steps of spinning mesophase pitch obtained with a petroleum pitch as a raw material into fibers and then pyrolyzing the fibers at a very high temperature of 3000° C. The results derived from X-ray diffraction conducted for crystallites constituting the carbon material were such that an average distance $d_{(002)}$ between adjacent (002) planes was 0.3375 nm, an average length Lc of crystallite as measured in the c-axis direction based on a diffraction peak appearing on a (002) plane was 21 nm, and an average length La of crystallite as measured in the a-axis direction based on a diffraction peak appearing on a (110) plane was 40 nm. In addition, the results derived from a Raman spectrum (measured with the carbon material using an argon laser having a wavelength of 514.5 nm) was such that a ratio of a peak intensity $(R_1)$ of 1360 $cm^{-1}$ to a peak intensity $(R_2)$ of 1580 $cm^{-1}$, i.e., $R_1/R_2$ was 0.1.

In practical, the secondary lithium cells 45a and 45b are used such that a plurality of secondary lithium cells are connected to each other in series so as to generate an output of e.g., about 20 KW at a room temperature. In addition, a power source shifting switch 48a and a load shifting switch 48b are arranged for the fuel cell main body 12 and the secondary lithium cells 45a and 45b, and a load 33 such as a driving motor or the like is electrically connected to the fuel cell main body 12 via the load shifting switch 48b. The load 33 is driven by the electric energy fed from the fuel cell main body 12 and/or the secondary lithium cells 45a and 45b.

Next, a mode of operation of the power generation system for an electric car constructed according to the first embodiment of the present invention will be described below.

Hydrogen gas produced in the reforming unit 13 is fed to the fuel electrode 12b, and at the same time, air (oxygen) compressed by the compressor 46 is fed to the oxygen electrode 12c. Electric power is supplied to the load 33 from the secondary lithium cells 45a and 45b via the power source shifting switch 48a during the initial time until the generation of electric energy is started with the fuel cell main body 12. When the temperature of the fuel cell main body 12 is elevated to a predetermined one so that the fuel cell main body 12 is ready to start the generation of electric energy, the shifting switches 48a and 48b are shifted from the secondary lithium cell 45a, 45b side to the fuel cell main body 12 side, whereby the electric power generated in the fuel cell main body 12 is supplied to the load 33.

While the fuel cell main body 12 generates electric power, it is continuously cooled by the refrigerant fed from the refrigerant tank 47. Since an electrolyte composed of a film of high molecular material (e.g., a film of perfluorocarbon sulfonic acid) exhibiting ionic conductivity at a comparatively low temperature ranging about 60° to 100° C. is used as a material for the electrolytic plate 12a, heat is radiated from the fuel cell main body 12 at a temperature ranging from about 60° to 100° C. In this embodiment, since a nonaqueous solvent (e.g., a solvent mixture consisting of ethylene carbonate and propylene carbonate) having a boiling temperature of 100° C. or more is used for the secondary lithium cells 45a and 45b, charging/discharging properties of the fuel cell main body 12 can be maintained at a higher level than those attainable at the room temperature. For example, when the refrigerant stored in the refrigerant tank 47 has a temperature of about 80° C., the environmental temperature is maintained at a level of about 60° C. under the influence of cooling effected by a heat radiating portion (cooling fins or the like) of the refrigerant tank 47, causing the temperature of each of the secondary lithium cells 45a and 45b disposed on the opposite sides of the refrigerant tank 47 to be maintained to about 50° C. by the heat of the environment. When an output from the secondary lithium cells 45a and 45b was measured, it was found that the output was 23 KW under the aforementioned condition and that increase of an output by about 15% was recognized compared with an output of 20 KW at the room temperature.

Figure 4:
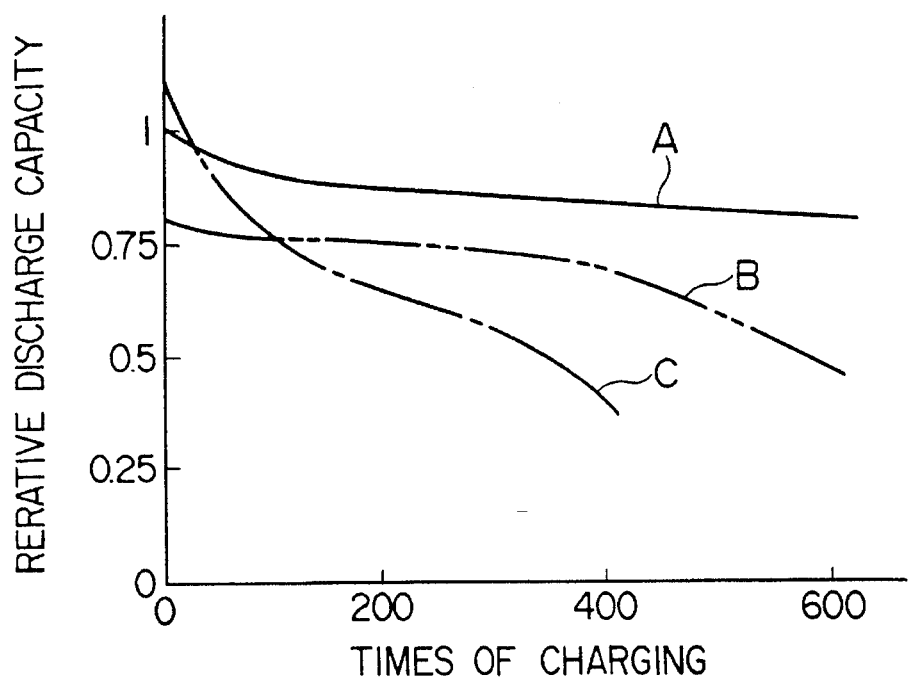
FIG. 4 is a characteristic diagram which shows a relationship between a relative discharge capacity of a secondary lithium battery and times of charging of the same in the power generation system constructed according to the first embodiment of the present invention.

FIG. 4 shows by way of characteristic curves the results derived from examinations conducted with respect to the relationship between a relative discharging capacity of the secondary lithium cells 45a and 45b disposed for applying electric energy to the load 33a and times of charging of the same. In this embodiment, when a comparison was made among a characteristic curve A representing the case that the secondary lithium batteries 45a and 45b had a temperature of 60° C., a characteristic curve B representing the case that they had a temperature of 40° C. and a characteristic curve C representing the case that they had a temperature of 80° C., it was found that when the secondary lithium cells 45a and 45b had a temperature of about 60° C., the relative discharging capacity was slightly reduced regardless of increase of the times of charging of secondary lithium cell and that the secondary lithium cells 45a and 45b exhibited excellent charging/discharging properties. Referring to FIG. 4 again, the relative discharging capacity of the secondary lithium cells 45a and 45b is shown in the drawing under a condition that it is represented by a numeral of 1 when each of the secondary lithium cells 45a and 45b have a temperature of 60° C. and no charging is effected for them.

Incidentally, in case that the secondary lithium cells 45a and 45b has a temperature higher or lower than 60° C., the charging/discharging properties of secondary lithium cell can be improved by properly adjusting not only the distance between the secondary lithium cells 45a and 45b and the refrigerant tank 47 but also the distance between the secondary lithium cells 45a and 45b and the fuel cell main body 12 so as to allow the secondary lithium cells 45a and 45b to be maintained at a temperature of about 60° C.

Comparative Example

Figure 5:
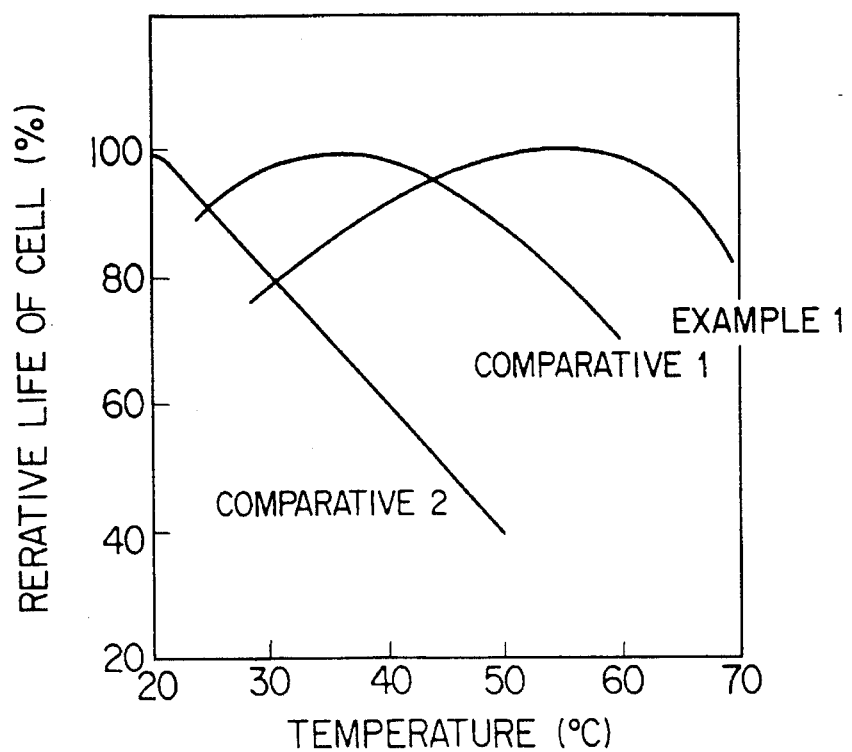
FIG. 5 is a characteristic diagram which shows a relationship between a relative life of secondary cell and a working temperature of the same in the power generation system constructed according to the first embodiment of the present invention.

For the purpose of comparison, the relationship between working temperature of each secondary lithium cell and the relative life of the same was evaluated by operating a power generation system having the same structure as that constructed according to the first embodiment of the present invention with the exception that a lead battery or nickel cadmium cells are substituted for the secondary lithium cells 45a and 45b. The results derived from the evaluation are as illustrated in FIG. 5. Specifically, in Comparative Example, it was confirmed that each secondary cell exhibited a longest relative life at a working temperature of 25° C. and 35° C. and that the relative life of each secondary cell was substantially reduced when each secondary cell was maintained at a working temperature of about 60° C. in the vicinity of the fuel cell main body 12. Incidentally, since it is found that electrodes of the lead battery deteriorate due to corrosion at an elevated temperature, and moreover, a charging efficiency of the nickel cadmium cell is reduced at an elevated temperature, it is considered that the foregoing reduction of the relative life of each secondary cell at an elevated temperature is attributable to an excessively large magnitude of load applied to the secondary cell.

Embodiment 2

Figure 6:
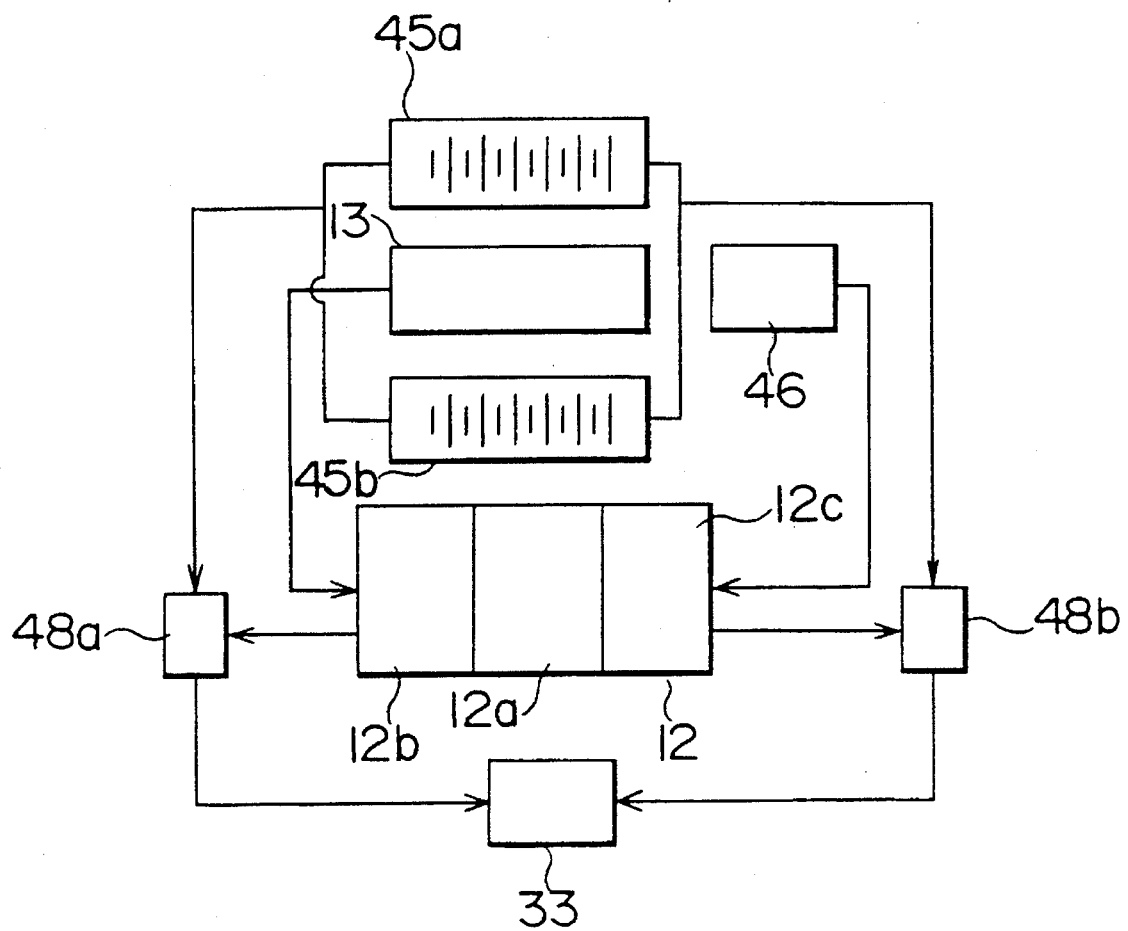
FIG. 6 is a systematic diagram which schematically shows the structure of a power generation system using a fuel cell according to a second embodiment of the present invention.

Next, a fuel cell power generation system for an electric car according to a second embodiment of the present invention will be described below with reference to FIG. 6 which schematically shows the structure of the power generation system. It should be noted that same components as those in the first embodiment of the present invention are represented by same reference numerals for the purpose of convenience.

In contrast with the first embodiment of the present invention shown in FIG. 3 wherein the secondary lithium cells 45a and 45b are disposed on the opposite sides of the refrigerant tank 47 which serves to heat them, according to the second embodiment of the present invention, secondary lithium cells 45a and 45b are disposed in the vicinity of the opposite sides of a reforming unit 13 for feeding hydrogen gas to a fuel cell main body 12. Since other components rather than the secondary lithium cells 45a and 45b and the reforming unit 13 are same to those in the first embodiment of the present invention in structure and function, repeated description on these components will not be required.

In this embodiment, a solid electrolyte composed of a composite substance consisting of a mixture of, e.g., poly[bis-(methoxy-ethoxy-ethoxide)phosphadine] and polyethylene oxide and a lithium salt (e.g., $LiClO_4$, $LiAsF_6$ or the like) is used. In addition, a carbon material serving to occlude and discharge lithium ions is used as a material employable for an anode of the secondary lithium cells 45a and 45b in the same manner as that in the first embodiment of the present invention, and $TiS_2$ is used as a material employable for a cathode of the secondary lithium cells 45a and 45b. Each of the secondary lithium cells 45a and 45b is prepared such that a plurality of secondary lithium cells are connected to each other in series so as to obtain an output of, e.g., about 20 KW at room temperature. In this embodiment, the reforming unit 13 is constructed in such a manner as to produce hydrogen gas by taking methanol and water therein as raw materials and then heating them with the aid of a burner disposed in the reforming unit 13, and the environmental temperature as measured in the vicinity of the reforming unit 13 is elevated up to a temperature of about 100° C. by the heat radiated from the reforming unit 13, whereby each of the secondary lithium cells 45a and 45b disposed on the opposite sides of the reforming unit 13 has a temperature of about 60° C. under the influence of the heat radiated from the reforming unit 13. When an output from the secondary lithium cells 45a and 45b was measured under the foregoing conditions, it was confirmed that the output from the same was increased by about 20% compared with case that the secondary lithium cells 45a and 45b were used at room temperature.

Similar to the preceding embodiment, also in this embodiment, it has been found that excellent charging/discharging properties of the secondary lithium cells 45a and 45b can be maintained by heating them with the aid of the reforming unit 13 compared with the case that they are used at room temperature. The foregoing advantageous effect was confirmed not only in case that LiNiO₂, LiMnO₂ or similar materials is substituted for TiS₂ used as a material employable for the cathode of the secondary lithium cells 45a and 45b but also in case that a compound containing a metallic lithium, a lithium alloy or a lithium compound is used as a material employable for the anode of the same.

Either in the first embodiment of the present invention or in the second embodiment of the same, the secondary lithium cells 45a and 45b are disposed in the vicinity of the refrigerant tank 47 as well as on the opposite sides of the reforming unit 13.

Alternatively, the secondary lithium cells 45a and 45b may be disposed in the vicinity of the fuel cell main body 12 without any loss of the same advantageous effect as mentioned above.

Embodiment 3

Next, a fuel cell power generation system for an electric car according to a third embodiment of the present invention will be described below with reference to FIG. 7 which schematically shows the structure of the power generation system.

Figure 7:
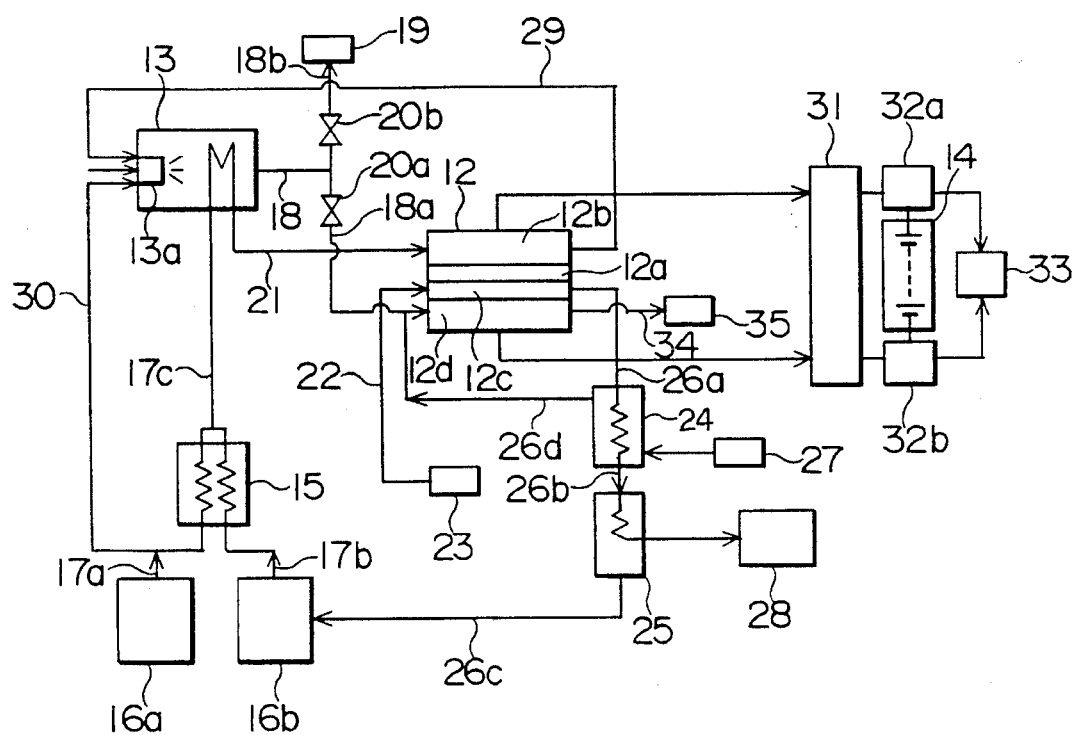
FIG. 7 is a systematic diagram which schematically shows the structure of a power generation system using a fuel cell according to a third embodiment of the present invention.

As shown in FIG. 7, the power generation system includes a fuel cell main body 12 for taking hydrogen gas and water therein so as to generate electric energy with them, a reforming unit 13 in which hydrogen gas is produced in the presence of a catalyzer in an atmosphere having a high temperature using methanol and water as raw materials so as to feed the thus produced hydrogen gas to the fuel cell main body 12, and a secondary cell 14 such as a lead battery or the like. The fuel cell main body 12 is constructed in a laminated structure in which a plurality of unit cells are laminated one above another. Incidentally, each unit cell is composed of a fuel electrode 12b, an electrolytic plate 12a, and an oxygen electrode 12c. In addition, the fuel cell main body 12 further includes a cooling plate 12d for cooling the fuel cell main body 12 itself by taking a coolant (air) therein at the time of generation of electric energy. A fuel tank 16a having methanol stored therein and a water tank 16b having water stored therein are connected to the reforming unit 13 via an evaporator 15. The evaporator 15 is connected to the fuel tank 16a and the water tank 16b via pipings 17a and 17b, while the reforming unit 13 is connected to the evaporator 15 via a piping 17c.

The reforming unit 13 is connected to the left-hand end of a first combustion gas exhaust pipe 18 which is bifurcated into a second combustion gas exhaust pipe 18a and a third combustion gas exhaust pipe 18b at the intermediate part thereof. The second combustion exhaust pipe 18a is connected to the cooling plate 12d in the fuel cell main body 12 and the third combustion exhaust pipe 18b is connected to a combustion gas exhaust outlet 19 so that the combustion gas produced by operating a burner 13a disposed in the reforming unit 13 is caused to flow into the cooling plate 12d via the second piping 18a and the combustion gas exhaust outlet 19 via the third piping 18b. It should be added that control valves 20a and 20b are disposed at the intermediate parts of the second and third combustion gas exhaust pipings 18a and 18b in order to properly control the flow of the combustion gas.

The left-hand end of a hydrogen exhaust pipe 21 is connected to the reforming unit 13, while the right-hand end of the same is connected to an inlet of the fuel electrode 12b in the fuel cell main body 12. In addition, an inlet of the oxygen electrode 12c is communicated with an air intake 23 via a piping 22. On the other hand, a heat exchanger 24 and a water recovering unit 25 are disposed between the oxygen electrode 12c of the fuel cell main body 12 and the water tank 16b while an exhaust outlet of the oxygen electrode 12c is connected to the water tank 16b via pipings 26a, 26b and 26c. The heat exchanger 24 is connected to the cooling plate 12d in the fuel cell main body 12 via a piping 26d. The heat exchanger 24 is communicated with a coolant intake 27 for the purpose of intake of a coolant such as air or the like, and the water recovering unit 25 is communicated with an air exhaust outlet 28. In addition, an exhaust outlet of the fuel electrode 12b in the fuel cell main body 12 is communicated with the reforming unit 13 via a piping 29, while the fuel tank 16a is communicated with the reforming unit 13 via a piping 30.

The fuel cell main body 12 and the secondary cell 14 constructed in the laminated structure having a plurality of lead batteries or the like laminated one above another is electrically connected to a converter 31 via shift switches 32a and 32b. The electric power generated in the fuel cell main body 12 and/or the secondary cell 14 is supplied to a load 33 such as a driving motor for an electric car or the like, and the secondary cell 14 is charged with the electric power applied from the fuel cell main body 12.

Next, a mode of operation of the power generation system constructed according to the third embodiment of the present invention will be described below.

Methanol and water are fed to the evaporator 15 from the fuel tank 16a and the water tank 16b via the pipings 17a and 17b, and then they are evaporated in the evaporator 15 to produce a raw material to be reformed in the reforming unit 13. The raw material produced in the evaporator is fed to the reforming unit 13 via the piping 17c. The foregoing raw material is burnt together with methanol fed from the fuel tank 16a via the piping 30 in the presence of air fed from the outside, by operating a burner 13a disposed in the reforming unit 13, whereby combustion gas, i.e., hydrogen gas is produced in the reforming unit 13.

The thus produced hydrogen gas is fed to the fuel electrode 12b in the fuel cell main body 12 via a hydrogen exhaust pipe 21, while air (oxygen) is fed to the oxygen electrode 12c from the air intake 23 via the piping 22. In addition, a coolant to be fed from a coolant intake 27, e.g., air or the like is heated in the heat exchanger 24 and then the coolant is fed to the cooling plate 12d in the fuel cell main body 12 via a piping 26d.

When the fuel cell main body 12 starts its operation, the valve 20a disposed at the intermediate part of the second combustion gas exhaust pipe 18a is opened but the valve 20b disposed at the intermediate part of the third combustion gas exhaust pipe 18b is closed, whereby the combustion gas produced in the reforming unit 13 with the aid of the burner 13a is caused to flow into the cooling plate 12d in the fuel cell main body 12 via the first and second combustion gas exhaust pipes 18 and 18a in order to further heat the air as a coolant fed to the cooling plate 12d. Thus, the fuel cell main body 12 is heated up to a predetermined temperature (e.g., 80° C.) for a short time (e.g., about 20 to 30 minutes), and when the temperature of the fuel cell main body 12 is elevated to the predetermined one, the power generation is started. During the initial time until the power generation is started with the fuel cell main body 12, the necessary electric energy is supplied to the load 33 from the secondary cell 14. When the power generation is started with the fuel cell main body 12, the shift switches 32a and 32b are shifted from the secondary cell 14 side to the fuel cell main body 12 side so that the electric energy generated in the fuel cell main body 12 is supplied to the load 33 via the converter 31.

After the generation of electric energy is started with the fuel cell main body 12, the valve 20a disposed on the second combustion gas exhaust pipe 18a is closed but the valve 20b disposed on the third combustion gas exhaust pipe 18b is opened, whereby the combustion gas fed from the reforming unit 31 is exhausted to the outside via a combustion gas exhaust outlet 19. Unreacted hydrogen gas exhausted from the fuel electrode 12b in the fuel cell main body 12 is fed to the burner 13a in the reforming unit 13 via a piping 29 so that it is burnt with the air (oxygen) fed from the outside. Thus, a quantity of methanol fed from the fuel tank 16a can be decreased.

On the other hand, the air (oxygen) exhausted from the oxygen electrode 12c in the fuel cell main body 12 is recovered in the heat exchanger 24 via the piping 26a. Since a large quantity of moisture is contained in the air exhausted from the oxygen electrode 12c, the air is delivered to the water recovering unit 25 via the piping 26b and subsequently, water recovered in the water recovering unit 25 is fed into the water tank 16b via the piping 26c. On the other, the air collected in the water recovering tank 25 is exhausted to the outside via an air exhaust outlet 28, and the air fed to the cooling plate 12d is likewise exhausted to the outside via a piping 34 and a coolant exhaust outlet 35.

During the initial time until the generation of electric energy is started with the fuel cell main body 12, the air heated by mixing the combustion gas fed from the reforming unit 13 with the air is fed to the cooling plate 12d, but while the fuel cell main body 12 is generating electric energy, the air taken in the heat exchanger 24 via a coolant intake 27 as a coolant is fed to the cooling plate 12d via the piping 26d in order to cool the fuel cell main body 12 with the air serving as a coolant.

According to the third embodiment of the present invention, a period of time that elapses during the initial time until the generation of electric energy is started with the fuel cell main body 12 can be shortened by allowing the combustion gas produced by operating the burner 13a in the reforming unit 13 to flow to the cooling plate 12d in the fuel cell main body 12 and then heating the air fed to the cooling plate 12d with the combustion gas so as to heat the fuel cell main body 12 up to a predetermined temperature for a short time.

Embodiment 4

Next, a fuel cell power generation system for an electric car according to a fourth embodiment of the present invention will be described below with reference to FIG. 8 which schematically shows the structure of the power generation system.

This embodiment is concerned with case that a fuel cell main body 12 having a liquid (e.g., water) used as a coolant to be fed to a cooling plate 12d thereof is used for the power generation system.

Figure 8:
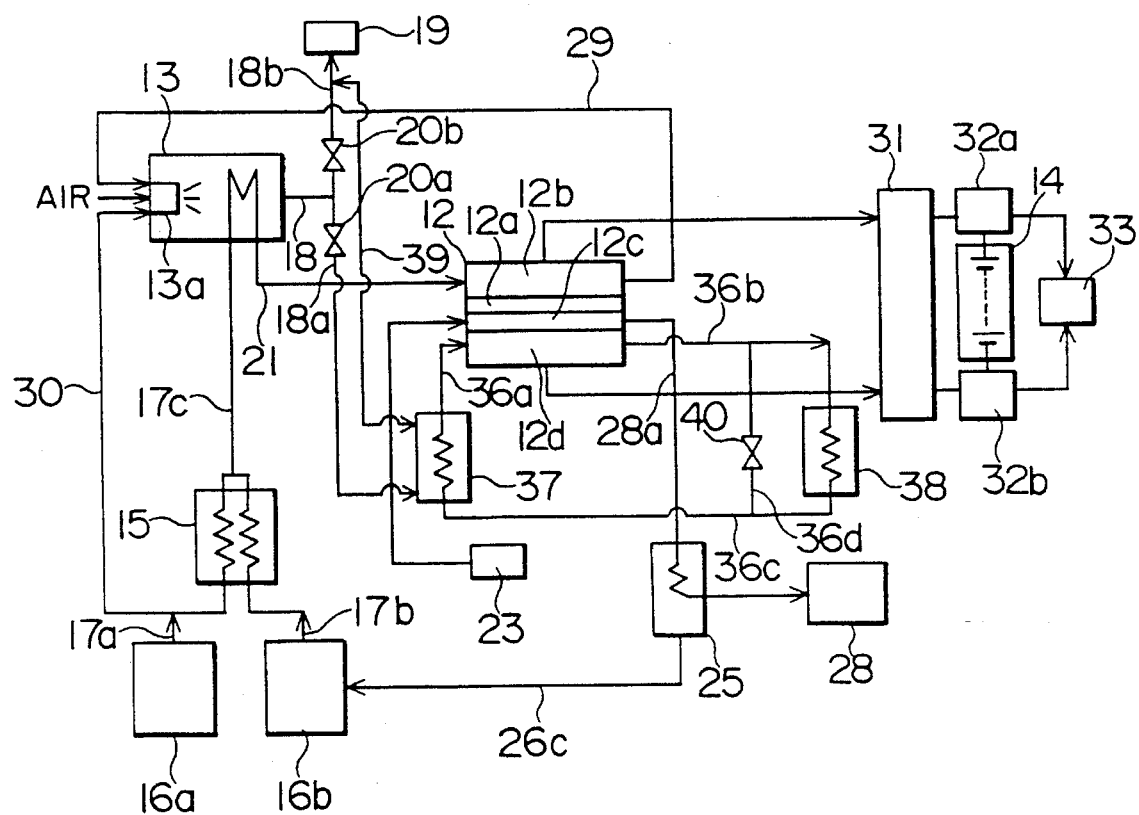
FIG. 8 is a systematic diagram which schematically shows the structure of a power generation system using a fuel cell according to a fourth embodiment of the present invention.

As shown in FIG. 8, a coolant preheater 37 is connected to a coolant inlet of the cooling plate 12d in a fuel cell main body 12 via a piping 36a, while a heat radiating unit 38 is connected to a coolant exhaust outlet of the same via a piping 36b, and the coolant preheater 37 and the heat radiating unit 38 are connected to each other via a piping 36c. In addition, a second combustion gas exhaust pipe 18a extending from a reforming unit 13 and a piping 39 communicated with a third combustion gas exhaust pipe 18b are connected to the coolant preheater 37, and a piping 36d having a valve 40 disposed at the intermediate part thereof is bridged between both the pipings 36b and 36c. Other components rather than the aforementioned ones are substantially coincident with those constituting the power generation system constructed according to the third embodiment of the present invention described above with reference to FIG. 7 in structure and function. Thus, repeated description on these components will not be required.

In this embodiment, during the initial time until the generation of electric energy is started with the fuel cell main body 12, a valve 20a disposed at the intermediate part of the second combustion gas exhaust pipe 18a is opened but a valve 20b disposed at the intermediate part of the third combustion gas exhaust pipe 18b is closed so that the combustion gas produced by operating a burner 13a in the reforming unit 13 is caused to flow into the coolant preheater 37 via the first and second combustion gas pipings 18 and 18a so as to heat a liquid coolant (e.g., water) to be fed to the cooling plate 12d from the coolant preheater 37, whereby the fuel cell main body 12 is heated up to a predetermined temperature (e.g., 80° C.) for a short time (e.g., about 20 to 30 minutes). After the combustion gas flows in the coolant preheater 37, it is exhausted to the outside via a piping 39 and a combustion gas exhaust outlet 19. Once the temperature of the fuel cell main body 12 is elevated to the predetermined one, the power generation is started with the fuel cell main body 12. As the liquid coolant is discharged from the cooling plate 12d, it is returned to the coolant preheater 37 via the piping 6b, the heat radiating unit 38 and the piping 36c. Functions of the power generation system other than the foregoing ones are substantially coincident those in the third embodiment of the present invention described above with reference to FIG. 7.

Also in this embodiment, during the operation of the fuel cell main body 12, the combustion gas produced by operating the burner 13a in the reforming unit 13 flows in the coolant preheater 37 so as to heat a liquid coolant to be fed to the cooling plate 12d in the fuel cell main body 12, whereby the temperature of the fuel cell main body 12 is elevated to the predetermined one for a short time, resulting in the starting time of the fuel cell main body 12 being substantially shortened.

Embodiment 5

Figure 9:
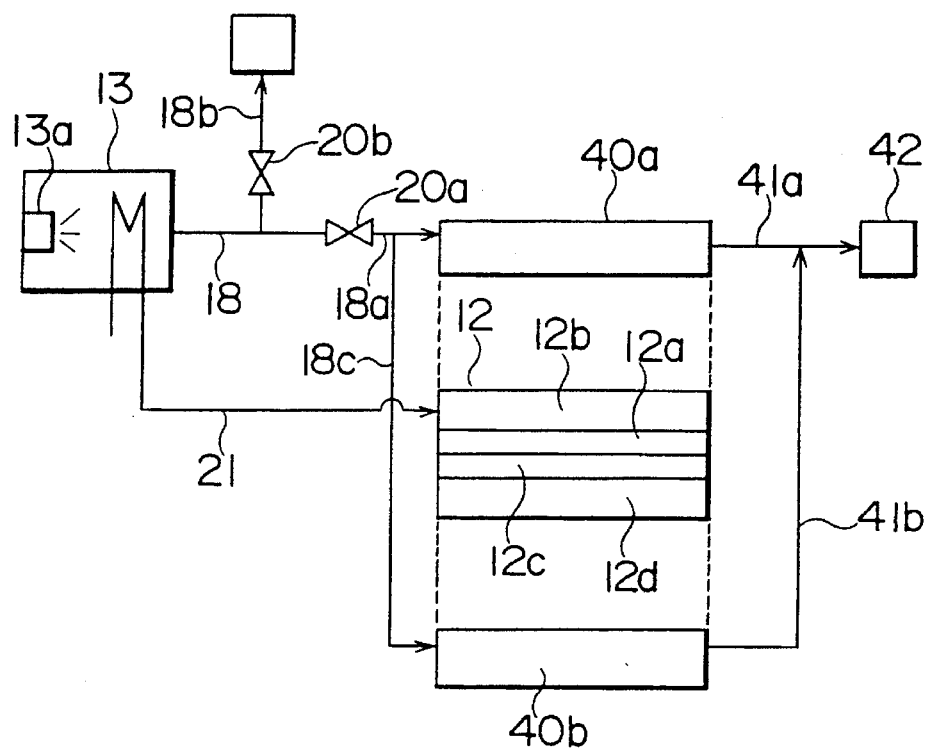
FIG. 9 is a fragmentary systematic diagram which schematically shows the structure of a power generation system using a fuel cell according to a fifth embodiment of the present invention, particularly illustrating essential components constituting the power generation system.

Next, a fuel cell power generation system for an electric car according to a fifth embodiment of the present invention will be described below with reference to FIG. 9 which schematically shows essential components constituting the power generation system.

In this embodiment, a unit cell is composed of a fuel electrode 12b, an electrolytic plate 12a, an oxygen electrode 12c and a cooling plate 12d, and a plurality of unit cells are laminated one above another with the horizontal attitude to build a fuel cell main body 12 in the laminated structure. A heating plate 40a is placed on the upper surface of the fuel cell main body 12, while another heating plate 40b is secured to the lower surface of the same. In addition, a first combustion gas exhaust piping 18, a second combustion gas exhaust piping 18a and a fourth combustion gas exhaust piping 18c are connected to the heating plates 40a and 40b so that the combustion gas produced in a reforming unit 13 is fed to the heating plates 40a and 40b via the combustion gas exhaust pipings 18, 18a and 18c. As the combustion gas is fed to the heating plates 40a and 40b, it is exhausted to the outside via pipings 41a and 41b and a combustion gas exhaust outlet 42. Functions of the power generation system other than the aforementioned ones are substantially coincident with those in the third embodiment of the present invention described above with reference to FIG. 7.

In case of the fifth embodiment, during the initial time until the generation of electric energy is started with the fuel cell main body 12, the combustion gas produced by operating a burner 13a in a reforming unit 13 is fed to the heating plates 40a and 40b via the first and second combustion gas exhaust pipings 18 and 18a so as to heat the whole fuel cell main body 12 up to a predetermined temperature for a short time, resulting in the initial time until the generation of electric energy is started with the fuel cell main body 12 being substantially shortened.

Embodiment 6

Figure 10:
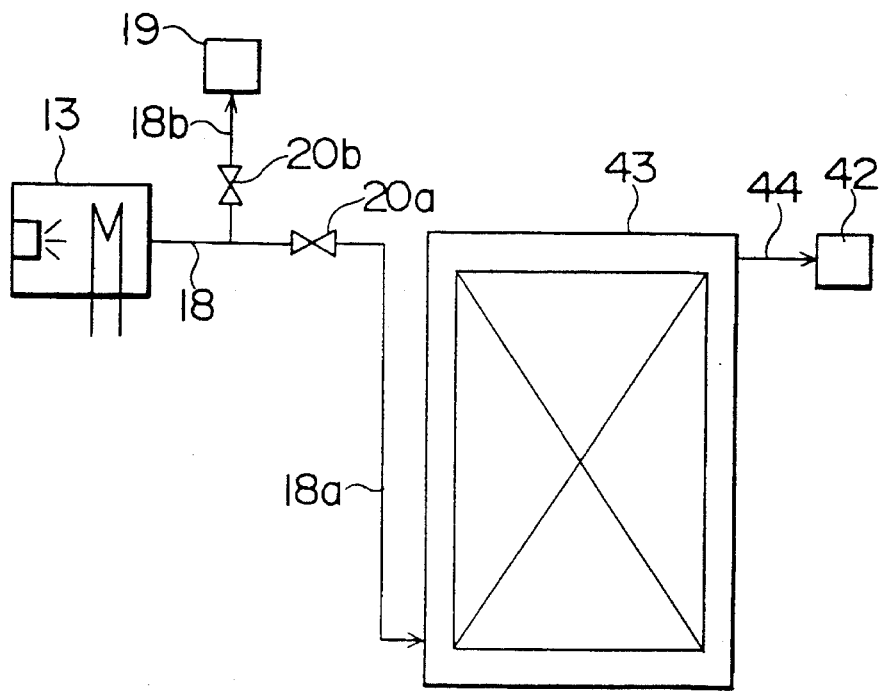
FIG. 10 is a fragmentary systematic diagram which schematically shows the structure of a power generation system using a fuel cell according to a sixth embodiment of the present invention, particularly illustrating essential components constituting the power generation system.

Next, a fuel cell power generation system for an electric car according to a sixth embodiment of the present invention will be described below with reference to FIG. 10 which schematically shows essential components constituting the power generation system.

In this embodiment, first and second combustion gas exhaust pipes 18 and 18a are connected to a container 43 in which a fuel cell main body 12 is received so that the combustion gas produced in a reforming unit 13 is fed to the fuel cell main body 12 via the first and second combustion gas exhaust pipes 18 and 18a. As the combustion gas flows in the container 43, it is exhausted to the outside via a piping 44 and a combustion gas exhaust outlet 42. Functions of the power generation system other than the aforementioned one are substantially coincident with those in the third embodiment of the present invention described above with reference to FIG. 7.

Also in this embodiment, during the initial time until the generation of electric energy is started with the fuel cell main body 12, the combustion gas produced in the reforming unit 13 is caused to flow into the container 43 via the first and second combustion gas exhaust pipings 18 and 18a so as to heat the whole fuel cell main body 12 up to a predetermined temperature for a short time in the same manner as the preceding embodiment, resulting in the initial time until the generation of electric energy is started with the fuel cell main body 12 being substantially shortened.

According to each of the third embodiment of the present invention to the sixth embodiment of the same, since the initial time until the generation of electric energy is started with the fuel cell main body 12 can be shortened, and moreover, the period of time that the electric energy is supplied from the secondary cell 14 such as a lead battery or the like additionally disposed in the power generation system can likewise be shortened, the number of secondary cells to be mounted on a vehicle can be reduced. In addition, when the power generation system is constructed by employing a combination made by two or more embodiments selected from the third embodiment of the present invention to the sixth embodiment of the same, the initial time until the generation of electric energy is started with the fuel cell main body 12 can be shortened further.

Embodiment 7

Figure 11:
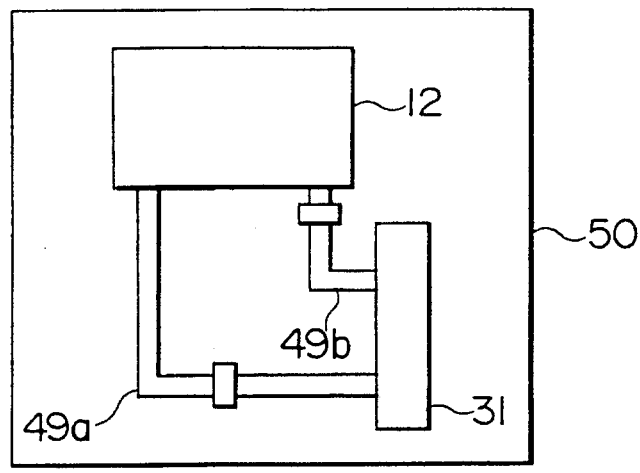
FIG. 11 is a plan view of a power generation system using a fuel cell according to a seventh embodiment of the present invention.
Figure 12:
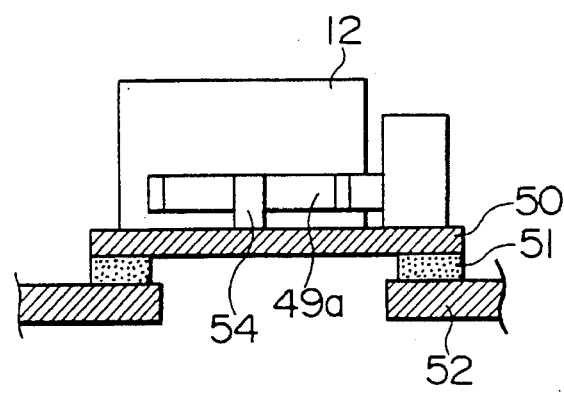
FIG. 12 is a side view of the power generation system shown in FIG. 11.

Next, a fuel cell power generation system for an electric car according to a seventh embodiment of the present invention will be described below with reference to FIG. 11 and FIG. 12. Incidentally, FIG. 11 is a plan view of the power generation system and FIG. 12 is a side view of the same.

As shown in the drawings, in this embodiment, a fuel cell main body 12 and a converter 31 electrically connected to each other via bus bars 49a and 49b are fixedly mounted on a flat plate-shaped common base 50 using bolts and nuts (not shown). The common base 50 is mounted on a frame 52 of a vehicle body while vibration absorbing members 51 each molded of a vibration proofing rubber or the like are interposed therebetween.

A unit cell is composed of a fuel electrode, an electrolytic plate and an oxygen electrode each of which is not shown in the drawings, and a plurality of unit cells are laminated one above another to build a fuel cell main body 12 in the laminated structure. The fuel electrode is connected to a reforming unit (not shown) to which hydrogen gas is fed, while the oxygen electrode is connected to a compressor from which compressed air (oxygen) is fed.

Figure 13:
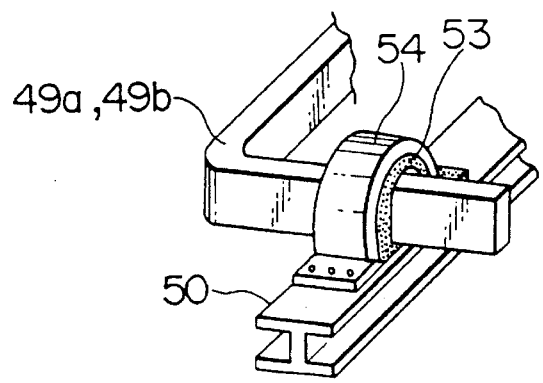
FIG. 13 is a perspective view of a mechanism for securing a bus bar to a common base.

As is best seen in FIG. 13, both the bus bars 49a and 49b are fixedly secured to the common base 50 via an electrical insulating material 53 with the aid of a fixing member 54 secured to the common base 50 using bolts and nuts.

In addition, a secondary cell such as a lead battery or the like (not shown) is electrically connected to the converter 13 via shift switches (not shown). During the initial time until the generation of electric energy is started with the fuel cell main body 12 or at the time of peak of power consumption, electric energy is supplied from the secondary cell (not shown) to a load such as a driving motor or the like (not shown), and after the fuel cell main body 12 starts to generate electric power, the shift switches are shifted to the fuel cell main body 12 side so as to feed to the load the electric energy generated in the fuel cell main body 12. It should be noted that the reforming unit, the compressor, the shift switches and the secondary cell each of which is not shown in the drawings are arranged outside of the common base 50.

According to the seventh embodiment of the present invention, since the fuel cell main body 12 and the converter 31 electrically connected to each other via the bus bars 49a and 49b are mounted on the common base 50 which in turn is mounted on the frame 52 of the vehicle body via the vibration absorbing members 51, relative displacement of the fuel cell main body 12 and the converter 31 relative to each other can be suppressed in the coplanar relationship regardless of an occurrence of vibration of the frame 52 during running of the vehicle. With this construction, since there does not arise a malfunction that joint portions not only between the bus bars 49a and 49b and the fuel cell main body 12 but also between the bus bars 49a and 49b and the converter 31 are undesirably loosened due to the vibration of the vehicle, the electric energy generated in the fuel cell main body 12 can be supplied to the converter 31 via the bus bars 49a and 49b without any loss with the result that a load (not shown) such as a driving motor or the like electrically connected to the converter 31 can be driven with excellent reliability.

Embodiment 8

Figure 14:
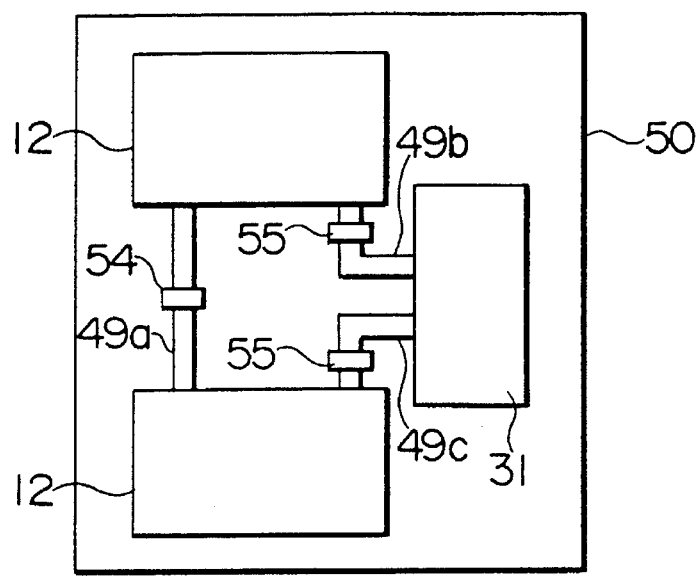
FIG. 14 is a plan view of a power generation system using fuel cells according to an eighth embodiment of the present invention.

Next, a fuel cell power generation system for an electric car according to an eighth embodiment of the present invention will be described below with reference to FIG. 14.

In this embodiment, a plurality of fuel cell main bodies (two fuel cell main bodies in the shown case) 12 are disposed on a common base 50, and they are electrically connected to a converter 31 via bus bars 49a, 49b and 49c. Other components rather than the aforementioned ones are substantially coincident with those in the seventh embodiment of the present invention described above with reference to FIG. 11 to FIG. 13. Also in case that a plurality of fuel cell main bodies 12 are used for the power generation system, since they are disposed on the common base 50 together with the converter 31 while they are electrically connected to the converter 31 via the bus bars 49a, 49b and 49c, similar to the seventh embodiment of the present invention, there does not arise a malfunction that joint portions not only between the fuel cell main bodies 12 and the bus bars 49a, 49b and 49c but also between the converter 31 and the bus bars 49b and 49c are undesirably loosened due to vibration of the vehicle.

Figure 15:
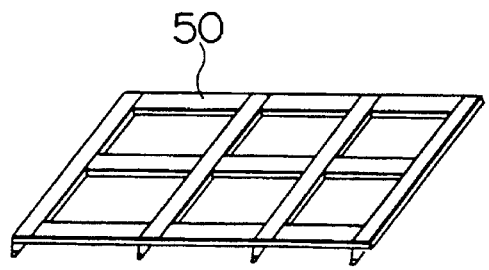
FIG. 15 is a perspective view which shows by way of example a common base employable for the power generation system constructed according to the seventh embodiment of the present invention and the eighth embodiment of the same.
Figure 16:
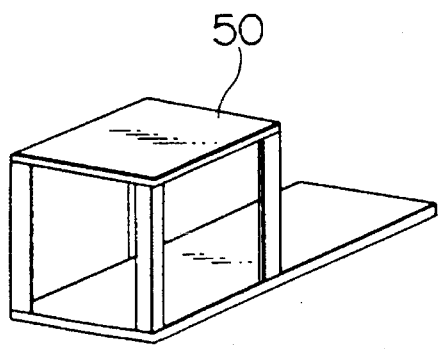
FIG. 16 is a perspective view which shows by way of example another common base employable for the power generation system constructed according to the eighth embodiment of the present invention.

In each of the seventh embodiment of the present invention and the eighth embodiment of the same, the flat plate-shaped common base 50 is employed for the power generation system. Alternatively, a lattice-shaped common base 50 having a plurality of L-shaped or H-shaped materials crosswise arranged as shown in FIG. 15 may be substituted for the flat plate-shaped common base 50. Otherwise, a three-dimensional common base 50 having a two-staged structure as shown in FIG. 16 may be substituted for the flat plate-shaped common base 50. In this embodiment shown in FIG. 14, merely the two fuel cell main bodies 12 and the converter 31 electrically connected to each other via the bus bars 49a, 49b and 49c are mounted on the common base 50. However, if the common base 50 has a sufficiently wide space, a reforming unit, a compressor, shift switches, a secondary cell and associated components may additionally be mounted on the common base 50.

Ninth Embodiment

Next, a fuel cell power generation system for an electric car according to a ninth embodiment of the present invention will be described below with reference to FIG. 17 and FIG. 18. Incidentally, FIG. 17 is a plan view of the power generation system and FIG. 18 is a side view of the same.

In this embodiment, side walls of a fuel cell main body 12 mounted on a common base 50 are firmly held by fixing members 54 with electrically insulating materials 53 interposed therebetween. Other components rather than the foregoing ones are coincident with those in the seventh embodiment in structure and function. The lower ends of the fixing members 54 are fixedly secured to the common base 50 which is mounted on a frame 52 of a vehicle body via vibration absorbing members 51 interposed therebetween.

With the power generation system constructed according to the ninth embodiment of the present invention, since the side walls of the fuel cell main body 12 are firmly held by the fixing members 54 while the electrical insulating materials 53 are interposed therebetween, there does not arise a malfunction that a plurality of unit cells constituting the fuel cell main body 12 in the laminated structure are dislocated from the original positions on the common base 50 due to vibration of the vehicle or the like.

Figure 17:
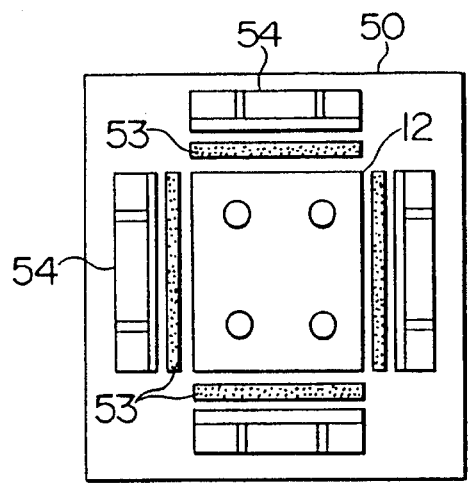
FIG. 17 is a fragmentary plan view of a power generation system using a fuel cell constructed according to a ninth embodiment of the present invention, particularly illustrating a mechanism for firmly holding the fuel cell on a common base.
Figure 18:
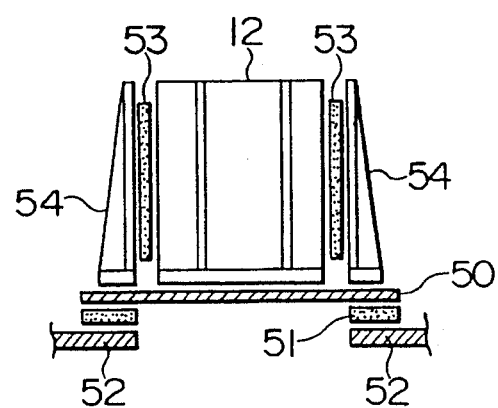
FIG. 18 is a side view of the mechanism for firmly holding the fuel cells on the common base in the power generation system according to a ninth embodiment of the present invention.
Figure 19:
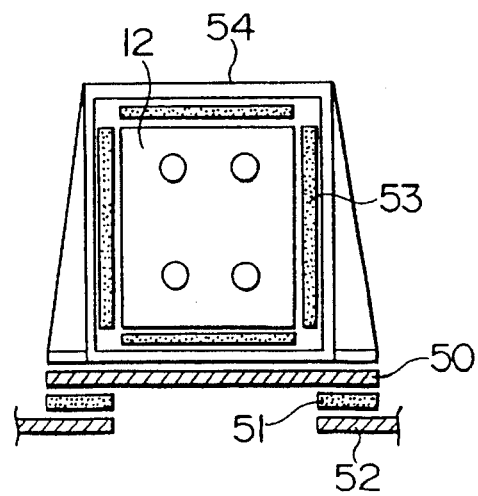
FIG. 19 is a side view of the mechanism for firmly holding a fuel cell on a common base according to another embodiment of the present invention modified from the ninth embodiment of the same.

FIG. 19 is a sectional view of a fuel cell power generation system constructed according to another embodiment of the present invention modified from the ninth embodiment of the same shown in FIG. 17 and FIG. 18. In the modified embodiment, a fuel cell main body 12 is firmly received in a box-shaped fixing member 54 with electrical insulating materials 53 interposed therebetween. The fixing member 54 is immovably mounted on a frame 52 of a vehicle body while vibration absorbing members 51 are interposed between the frame 52 and a base 50 for the fuel cell main body 12 and the box-shaped fixing member 54. Also in the modified embodiment, there does not arise a malfunction that a plurality of cell units constituting the fuel cell main bodies 12 in the laminated structure are dislocated from the original positions in the box-shaped fixing member 54 due to vibration of the vehicle.

While the present invention has been described above with respect to the case that the power generation system is employed for an electric car, it should of course be understood that the present invention should not be limited only to the electric car but it may equally be applied to other type of a power generation system, e.g., a movable power source having a light weight and a compact structure.

As is apparent from the above description, a fuel cell power generation system according to the first aspect of the present invention comprises a fuel cell including a film of high molecular material having ionic conductivity to operate at a low temperature (40° to 100° C.) as an electrolytic layer employable for the fuel cell and the secondary lithium cell having a nonaqueous electrolytic solution or a solid electrolyte employed therefore to serve as a secondary cell. With this construction, the secondary lithium cell can maintain excellent charging/discharging properties within the working temperature range of the fuel cell. In other words, with the power generation system constructed in that way, the fuel cell employed for the power generation system generates continuously electric energy to the load at a comparatively low temperature and the secondary lithium cell adapted to supplying supplementary electric energy to the load has no possibility that its temperature is undesirably elevated but exhibits excellent charging/discharging properties within the working temperature range. Consequently, the power generation system reliably exhibits a function required as a power source for an electric car, i.e., a function that the fuel cell main body bears a task for generating energy required for maintaining a sufficiently long running distance and the secondary cell bears another task for generating energy required not only at the initial time until the generation of electric energy is started with the fuel cell main body but also at the time when a magnitude of the load varies. In addition, since it is possible that the secondary cell can maintain excellent charging/discharging properties within the heat radiating range of the fuel cell main body, they can be disposed in the vicinity of the fuel cell main body. Thus, the power generation system can be constructed in a compact manner.

With the power generation system constructed according to the second aspect of the present invention, since the period of time that elapses until the fuel cell main body starts to generate electric energy (i.e., the initial time until the generation of electric energy is started with the fuel cell main body) can substantially be shortened by heating the fuel cell main body up to a predetermined temperature by utilizing the combustion gas to be used when hydrogen gas is produced in the reforming unit, the fuel cell main body can improve a power generating efficiency. Since the improvement of the power generating efficiency of the fuel cell main body makes it possible to reduce a quantity of electric power to be fed from the secondary cell operable in combination with the fuel cell main body, the number of secondary cells can be reduced. Thus, the power generation system can be constructed with light weight in a compact manner.

In addition, according to each of the third and fourth aspects of the present invention, since at least the fuel cell main body and the converter electrically connected to each other via the bus bars each made of an electrical conductive metallic material having a large thickness are mounted on the common (same) base via the vibration absorbing members interposed therebetween, relative displacement of the fuel cell main bodies and the converter relative to each other can be suppressed in the coplanar relationship. Thus, there does not arise a malfunction that joint portions between the fuel cell main body and the converter are undesirably loosened under the thermal influence attributable to the electric energy supplied to them. Consequently, the power generation system can be constructed with excellent reliability in a compact manner.

What is claimed is:

1. A fuel cell power generation system comprising:
   a reforming unit for heating and decomposing a raw material composed of a liquid fuel and water as main components using combustion gas to produce hydrogen gas;
   a fuel cell for continuously supplying electric power to a load, said fuel cell comprising an electrolytic layer, a fuel electrode disposed along one main surface of said electrolytic layer, and an oxygen electrode disposed along another main surface of said electrolytic layer, wherein said fuel electrode takes said hydrogen gas produced in said reforming unit and said oxygen electrode takes oxygen so as to generate electric energy;
   a secondary cell for supplying a quantity of electric energy required for operating said load at least during an initial time until the generation of electric energy is started with said fuel cell or at a time when the magnitude of said load varies; and
   means for shifting the power source of electric energy to be supplied to said load from said fuel cell to said secondary cell or from said secondary cell to said fuel cell,
   wherein said electrolytic layer of said fuel cell is composed of a film of high molecular weight material having ionic electrical conductivity, and said secondary cell is a secondary lithium cell consisting of a nonaqueous solution based material or a solid electrolyte based material as an electrolyte, said secondary cell disposed in thermal-coupled relation with other components of the power generation system such as to operate reliably in a working temperature ranging from 40° to 100° C.

2. A power generation system according to claim 1, wherein said secondary lithium cell comprises a carbon material as an anode material.

3. A power generation system according to claim 2, wherein an average distance $d_{(002)}$ between adjacent (002) planes of said carbon material as measured by X-ray diffraction method is 0.37 nm or less.

4. A power generation system according to claim 2, wherein an average length La of said carbon material in the a-axis direction as measured from the diffraction peak of (110) plane or (10) plane by X-ray diffraction method is 10 nm or more.

5. A power generation system according to claim 2, wherein an average length Lc of said carbon material in the c-axis direction as measured from the diffraction peak of (002) plane or (004) plane by X-ray diffraction method is 15 nm or more.

6. A power generation system according to claim 2, wherein a ratio $R_1/R_2$ of a peak intensity $R_1$ of 1360 $cm^{-1}$ in a Raman spectrum of said carbon material to a peak intensity $R_2$ of 1580 $cm^{-1}$ in a Raman spectrum of said carbon material is 1 or less, wherein said Raman spectrum is measured by use of an argon laser having a wavelength of 514.5 nm as a light source.

7. A power generation system according to claim 1, wherein said secondary lithium cell is disposed in proximate relation to a coolant tank provided for feeding a coolant for cooling said fuel cell when said fuel cell generates electric energy.

8. A power generation system according to claim 1, wherein said secondary lithium cell is disposed in proximate relation to said reforming unit.

9. A power generation system according to claim 1, wherein said secondary lithium cell is disposed in proximate relation to said fuel cell.

10. A fuel cell power generation system comprising:
    a reforming unit for heating and decomposing a raw material composed of a liquid fuel and water as main components using combustion gas to produce hydrogen gas;
    a fuel cell for continuously supplying electric power to a load, said fuel cell comprising a fuel electrode and an oxygen electrode with an electrolytic layer interposed between said fuel electrode and said oxygen electrode, and a heat exchange plate in thermal-coupled relation with at least one of said fuel and oxygen electrodes, wherein said fuel electrode takes said hydrogen gas produced in said reforming unit and said oxygen electrode takes oxygen so as to generate electric energy;
    a secondary cell for supplying a quantity of electric energy required for operating said load at least during an initial time until the generation of electric energy is started with said fuel cell or at a time when a magnitude of said load varies; and
    means for shifting the power source of electric energy to be supplied to said load from said fuel cell to said secondary cell or from said secondary cell to said fuel cell,
    wherein said power generation system comprises fuel cell heating means for heating said fuel cell up to a desired temperature so as to enable said fuel cell to start the generation of electric energy by conducting, to said heat exchange plate, heat of said combustion gas used for heating and decomposing said raw material in said reforming unit.

11. A power generation system according to claim 10, wherein said electrolytic layer is composed of a film of high molecular weight material having ionic conductivity, and said secondary cell is a secondary lithium cell consisting of a nonaqueous solution based material or a solid electrolyte based material as an electrolyte.

12. A power generation system according to claim 11, wherein said secondary lithium cell comprises a carbon material as an anode material, said carbon material having a graphite structure and being composed of a crystalline portion consisting of crystallites and an amorphous portion.

13. A power generation system according to claim 12, wherein an average distance $d_{(002)}$ between adjacent (002) planes of said crystallites as measured by X-ray diffraction method is 0.37 nm or less.

14. A power generation system according to claim 12, wherein an average length La of each crystallite in the a-axis direction as measured from the diffraction peak of (110) plane or (10) plane by X-ray diffraction method is 10 nm or more.

15. A power generation system according to claim 12, wherein an average length Lc of said crystallites in the c-axis direction as measured from the diffraction peak of (002) plane or (004) plane by X-ray diffraction method is 15 nm or more.

16. A power generation system according to claim 12, wherein a ratio $R_1/R_2$ of a peak intensity $R_1$ of 1360 cm$^{-1}$ in a Raman spectrum of said carbon material to a peak intensity $R_2$ of 1580 cm$^{-1}$ in a Raman spectrum of said carbon material is 1 or less, wherein said Raman spectrum is measured by use of an argon laser having a wavelength of 514.5 nm as a light source.

* * * * *